United States Patent [19]

Fritsch

[11] 3,947,195
[45] Mar. 30, 1976

[54] APPARATUS FOR USE IN PROCESSING MOLTEN PLASTICS

[76] Inventor: Rudolf Paul Fritsch, Goslarer Str. 58, 7 Stuttgart-31, Germany

[22] Filed: July 31, 1974

[21] Appl. No.: 493,276

[30] Foreign Application Priority Data
Aug. 2, 1973  Germany............................ 2339194

[52] U.S. Cl.................................. 425/190; 425/217
[51] Int. Cl.² ........................................ B29C 29/00
[58] Field of Search .......... 425/185, 190, 217, 252; 260/78 L

[56] References Cited
UNITED STATES PATENTS

| | | | |
|---|---|---|---|
| 3,048,567 | 8/1962 | Kohlwey | 260/78 L |
| 3,099,045 | 7/1963 | Honkanen | 425/217 X |
| 3,167,811 | 2/1965 | Kraus et al. | 425/217 |
| 3,589,163 | 6/1971 | Byrne et al. | 425/185 X |
| 3,689,183 | 9/1972 | Denberger | 425/217 |
| 3,706,515 | 12/1972 | Keuerleber et al. | 425/252 X |

FOREIGN PATENTS OR APPLICATIONS

| | | | |
|---|---|---|---|
| 1,312,696 | 8/1962 | France | 425/217 |

Primary Examiner—Ronald J. Shore
Attorney, Agent, or Firm—Shenier & O'Connor

[57] ABSTRACT

Apparatus for use in processing molten plastics is connected to a polymerisation vessel and has an outlet, a pump and three-way gate valve downstream of the pump. The three-way valve has an inlet connected to the pump, an outlet connected to the vessel and an outlet connected to the outlet of the apparatus.

4 Claims, 3 Drawing Figures

APPARATUS FOR USE IN PROCESSING MOLTEN PLASTICS

BACKGROUND OF THE INVENTION

The invention relates to apparatus for use in processing molten plastics, particularly but not exclusively for use in extruding plastics strands in the production of plastics granulate.

Plants for the production of plastics granulate comprise a polymerisation vessel and a pump disposed downstream thereof and adapted to deliver the molten plastics into a die head from whose die bores plastics strands are discharged downwardly. The strands are then taken up by a haul-off and cooling device in which the plastics strands become hardened whereupon they are granulated. The process which takes place in the polymerisation vessl normally requires several hours during which the product polymerises while being constantly stirred. The plastics granulate is therefore produced in batches. During the entire period it is necessary not only for the polymerisation vessel to be heated but for all parts of the plant between the polymerisation vessel and the die head to be heated in order to avoid solidification in such parts of the apparatus of the plastics derived from the last processed batch, an effect which would render the plant useless. It is therefore not possible to avoid temperature-sensitive plastics becoming thermally damaged in the hot pipe lines and ports between the polymerisation vessel and the die head during the polymerisation process. Operation with known plants therefore made it necessary to discard the batch of granulate which was initially produced.

SUMMARY OF THE INVENTION

It is an object of the invention to limit such losses of plastics.

According to the present invention there is provided apparatus for use in processing molten plastics, including means for connection to a polymerisation vessel, an outlet, a pump, and a three-way valve downstream of the pump, the three-way valve having an inlet which is connected to the pump, an outlet for connection to the vessel and another outlet connected to the outlet of the apparatus.

The inventor has proceeded from the fundamental consideration that the quantities of thermally damaged plastics, which are small by comparison to the contents of the polymerisation vessel can be mixed with the material of a fresh batch.

The outlet of the apparatus will, in use, be connected to an extrusion die.

With this apparatus it is possible, on completion of the polymerisation process, to flush the pipe line and port system with fresh polymerised material as far as a position immediately in front of the die head when the three-way valve is in one position, the fresh polymerised material together with the plastics residue of the last batch being pumped back into the polymerisation vessel where it is mixed with fresh polymerised material, for example, by means of an agitator. The production of plastics strands then commences after the three-way valve is changed over.

Particularly rapid changeover of the three-way valve can be ensured if the said valve is a gate valve operated by pressure medium.

In the course of efforts directed towards obtaining the least loss of quality of the plastics granulate resulting from thermally damaged plastics it is also advisable to provide the apparatus according to the invention with at least two pumps, connected in parallel, instead of only one pump. This provides the advantage that a specific delivery rate can be achieved with pumps which operate more slowly and generate less heat so that the risk of thermal damage to the plastics material in the pump is avoided.

BRIEF DESCRIPTION OF THE DRAWINGS

An embodiment of this invention will now be described, by way of example only, with reference to the accompanying drawing in which.

DESCRIPTION OF THE PREFERRED EMBODIMENTS

Figure 1:
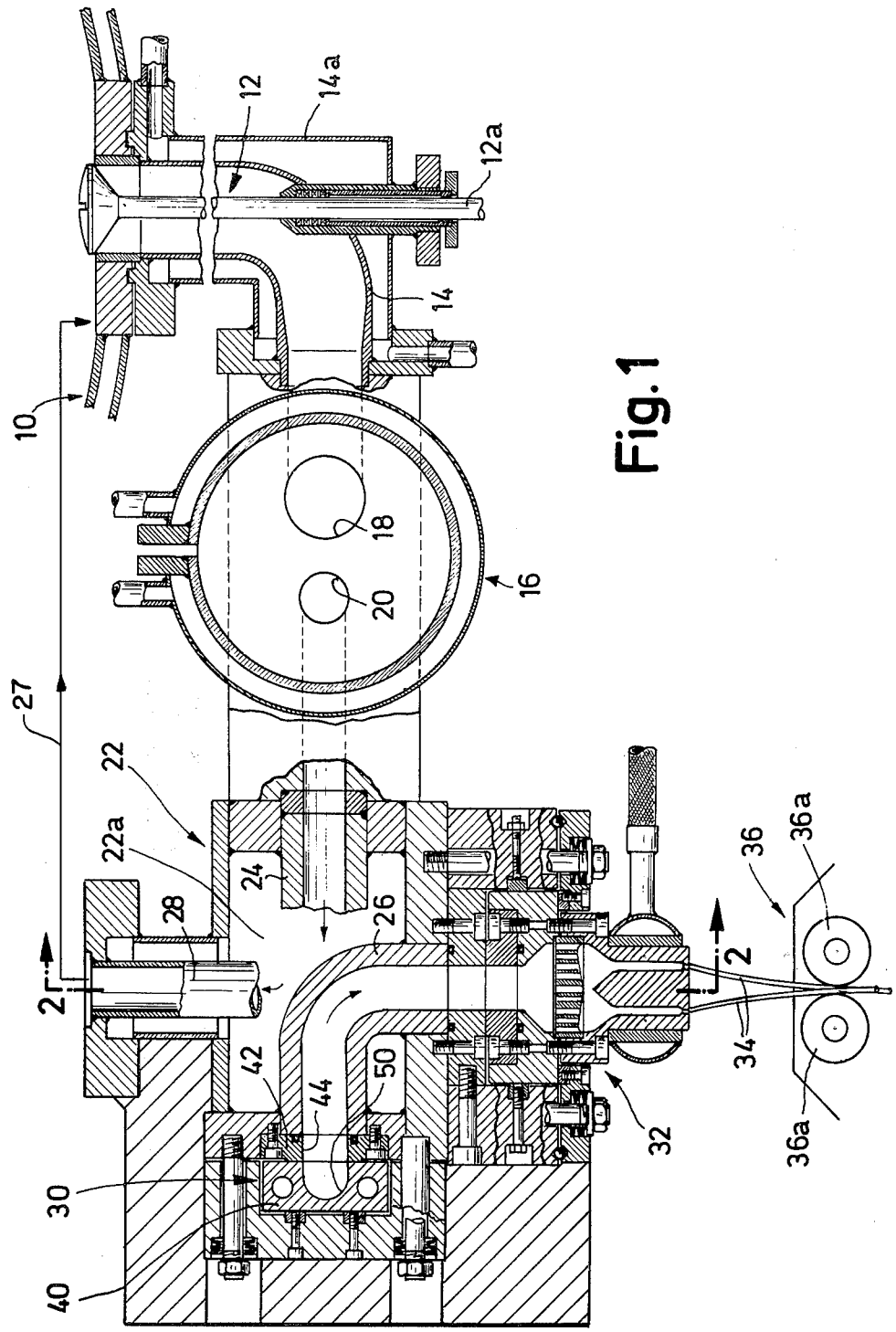
FIG. 1 is a vertical section through a part of apparatus for producing plastics granulate, the figure being confined only to the beginning of a haul-off and cooling device for the extruded plastics strands.
Figure 2:
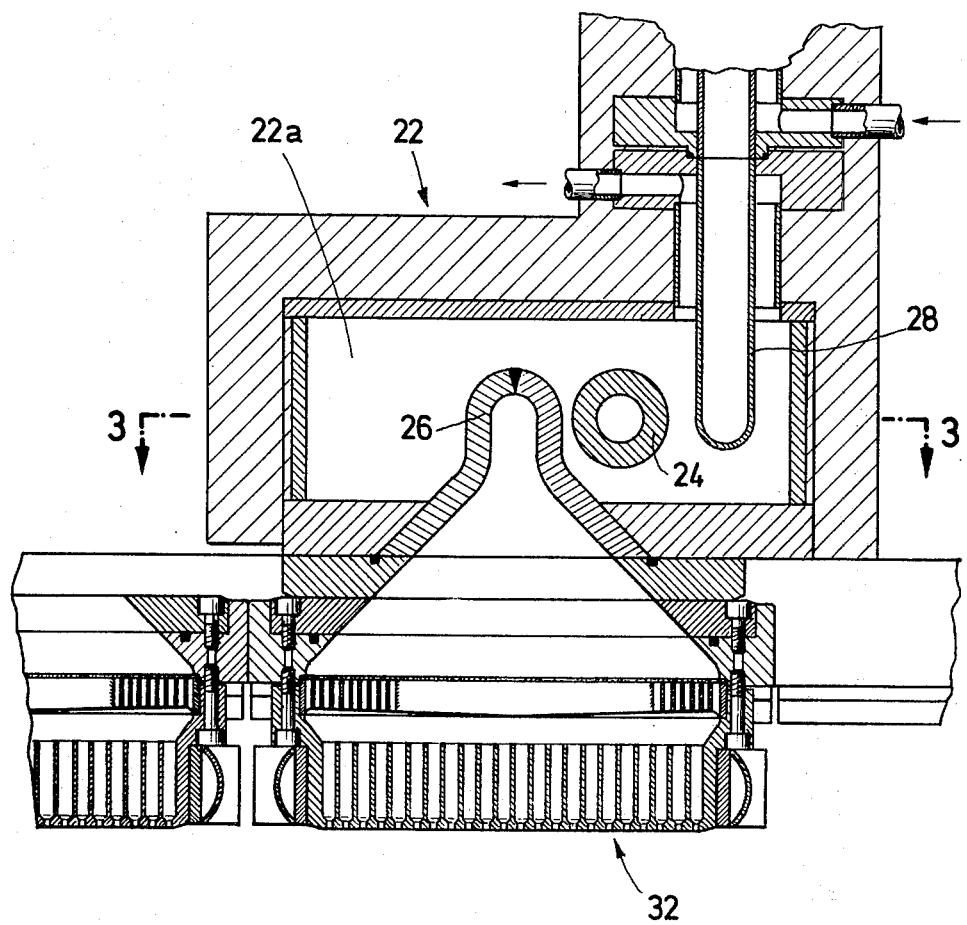
FIG. 2 is a section along the line 2-2 of FIG. 1.

FIG. 1 discloses the bottom of a double-walled polymerisation vessel 10 which can therefore be heated by means of a thermal oil medium but is not shown. A batch of the plastics which is to be processed into granulate is polymerised in the aforementioned vessel. The bottom of the vessel is provided with an outlet valve, referenced in its entirety with the number 12 and adapted to be operated through its shaft 12a in a manner which is not shown. The polymerisation vessel communicates through a connecting pipe 14 with a pumping unit of which only one pump casing 16 and an inlet pipe 18 and an outlet pipe 20 is shown. Two parallel connected pumps, for example, gear pumps, should be provided between the inlet pipe and the outlet pipe. To heat this part of the plant the connecting pipe 14 is surrounded by a jacket 14a and the pump casing 16 is double-walled.

The pumping unit communicates with a distributor housing 22 through the outlet pipe 20, the distributor housing incorporating an inlet pipe 24, an outlet pipe 26, a riser 28 and a gate valve which is referenced in its entirety by the numeral 30. The pumping unit communicates with the gate valve through the inlet pipe 20, the gate valve communicates with the die head, referenced in its entirety with the numeral 32, through the outlet pipe 26 and the gate valve finally communicates with the polymerisation vessel 10 in a manner not shown by means of the riser pipe 28.

No detailed description of the die head 32 is necessary because it is not subject of the present invention.

The plastic strands 34 which are extruded downwardly from the die head are taken up by a haul-off and cooling device 36 of which only the feed rollers 36a are shown.

A liquid thermal medium can be conducted through the interior 22a of the distributor housing 22 so that the latter can be heated in its entirety.

Figure 3:
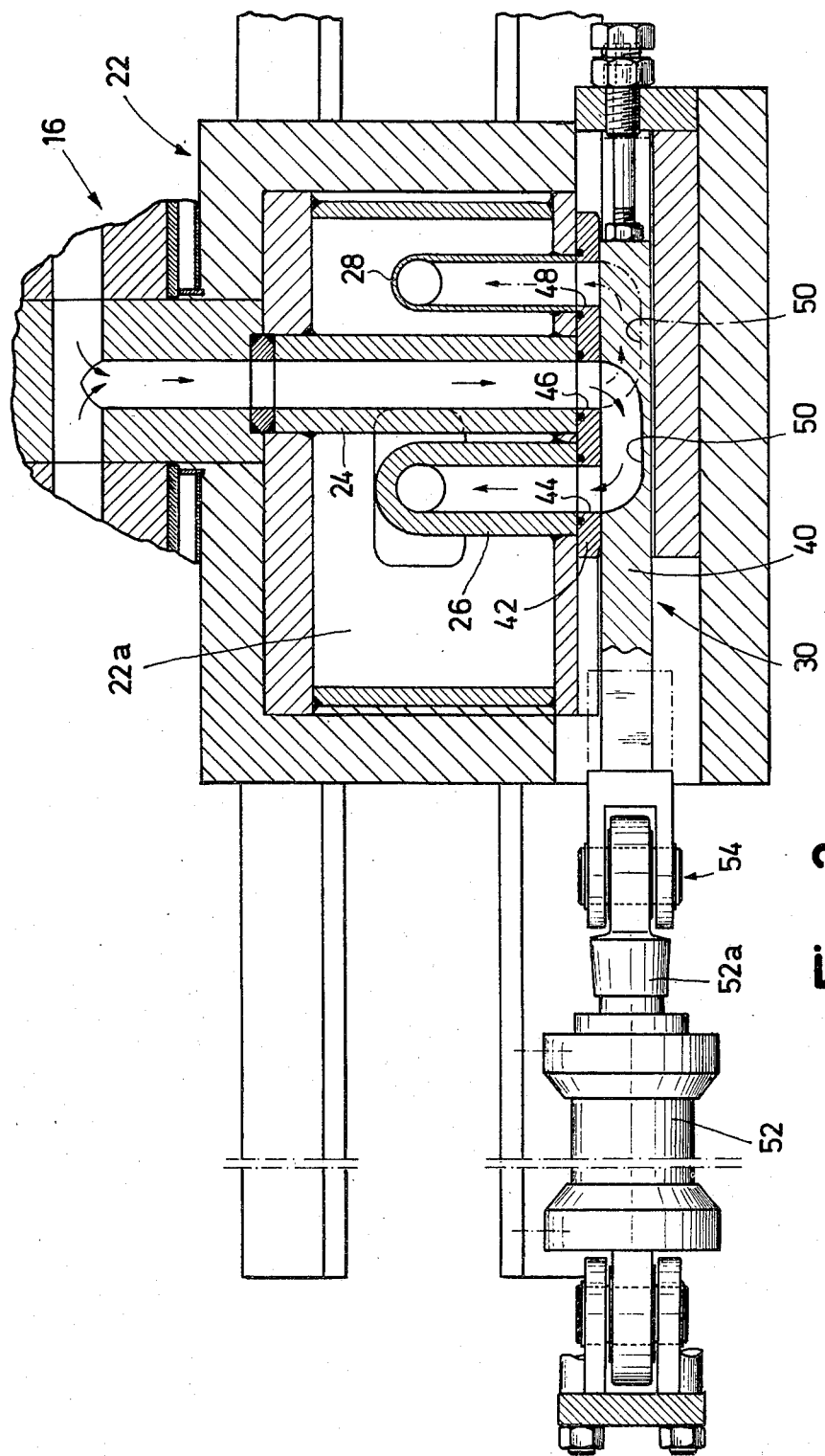
FIG. 3 is a section along the line 3-3 of FIG. 2.

As may be seen by reference to FIGS. 1 and 3 the gate valve 30, representing a three-way valve comprises a valve gate 40 and a distributor plate 42 cooperating therewith and having three ports 44, 46 and 48, the distance between said ports corresponding to the length of a U-shaped recess 50 in the valve gate 40. In the gate position shown in FIG. 3 the inlet pipe 24 communicates with the outlet pipe 26 while FIG. 3 shows in dash-dot lines the position of the valve gate in which the inlet pipe communicates with the riser pipe 28. The valve gate is operated by a pneumatic cylinder 52 to whose piston rod 52a the valve gate is jointed at 54.

While a new batch is being polymerised in the polymerisation vessel it is possible for heat-sensitive plastics deriving from the processing of the last batch and filling the plant between the polymerisation vessel and the gate valve 30 to be thermally damaged because all parts between the polymerisation vessel and the die head 32 must be heated in order to avoid solidification of the plastics. In the illustrated embodiment a substantial part of the quantity of molten plastics derived from the last batch is now, according to the invention and prior to the preparation of granulate from the newly prepared charge, largely carried back to the polymerisation vessel and is there mixed with the fresh polymerisate. For this purpose, the valve gate 40 is placed in its right-hand position according to FIG. 3 (illustrated by dash-dot lines), whereupon the outlet valve 12 is opened and the pumping unit is started. The latter now pumps molten plastic of the fresh polymerisate through the connecting pipe 14, the pumping unit itself, the inlet pipe 24, the gate valve 30, and through the riser 28 back to the polymerisation vessel, where with the help of a stirrer, not shown, an intimate mixing is brought about. Subsequently the gate valve 30 is positioned, so that the valve gate 40 connects the inlet pipe 24 with the outlet pipe 26. At the start of the extrusion process only a very small amount of the molten plastic derived from the preceding charge will be pressed out of the die head 32, namely, that plastic which was still present in the outlet pipe 26 and in the die head itself. However, in some cases, this plastic will have previously run off under the influence of gravity and could be led into a waste container.

I claim:

1. Apparatus for producing plastics granulate from batches of freshly polymerized molten plastics including in combination a polymerization vessel in which a batch of plastics is polymerized, an extrusion die, a supply line connecting said polymerization vessel to said extrusion die, said supply line comprising a pump and downstream of said pump a three-way valve having an inlet duct connected with said pump and a first outlet duct and a second outlet duct, said first outlet duct being connected with said extrusion die and a recycling line connecting said second outlet duct with said polymerisation vessel, said valve being actuatable between a first position thereof in which said first outlet duct is connected to said inlet duct for the extrusion of plastic strands to be granulated and a second position of said valve in which said second outlet duct is connected with said inlet duct for flushing all of the supply line between the vessel and the valve and the pump and the valve itself and the recycling line after completion of the polymerization process and prior to starting of the extrusion process.

2. Apparatus as claimed in claim 1, wherein the three-way valve is a gate valve.

3. Apparatus as claimed in claim 2 wherein the gate valve is operated by pressure medium.

4. Apparatus as claimed in claim 1, including at least two parallel connected pumps in said supply line.

* * * * *